US008416693B2

(12) United States Patent
Vanunu et al.

(10) Patent No.: US 8,416,693 B2
(45) Date of Patent: Apr. 9, 2013

(54) ERRORLESS AND HITLESS VARIABLE DATA RATE COMMUNICATIONS

(75) Inventors: Yuval Vanunu, Givataim (IL); Oded Navi, Holon (IL); Yaron Refaely, Herzlia (IL); Yoav Heiman, Beit Horon (IL); Isaac Rosenhouse, Kiryat-Ono (IL)

(73) Assignee: Ceragon Networks Ltd., Tel-Aviv (IL)

( * ) Notice: Subject to any disclaimer, the term of this patent is extended or adjusted under 35 U.S.C. 154(b) by 0 days.

(21) Appl. No.: 12/678,515

(22) PCT Filed: Sep. 23, 2008

(86) PCT No.: PCT/IL2008/001274
§ 371 (c)(1),
(2), (4) Date: Mar. 17, 2010

(87) PCT Pub. No.: WO2009/040800
PCT Pub. Date: Apr. 2, 2009

(65) Prior Publication Data
US 2010/0214980 A1 Aug. 26, 2010

Related U.S. Application Data

(60) Provisional application No. 60/960,288, filed on Sep. 24, 2007.

(51) Int. Cl.
*G01R 31/08* (2006.01)
(52) U.S. Cl. .................................... 370/235; 370/395.4
(58) Field of Classification Search .................. 370/235, 370/395.4
See application file for complete search history.

(56) References Cited

U.S. PATENT DOCUMENTS

| 4,868,641 A | 9/1989 | Modaresse |
| 5,367,562 A | 11/1994 | Tourbah et al. |

(Continued)

FOREIGN PATENT DOCUMENTS

| EP | 0810808 | 12/1997 |
| WO | WO 99/21362 | 4/1999 |

(Continued)

OTHER PUBLICATIONS

Communication Pursuant to Article 94(3) EPC Dated Sep. 8, 2010 From the European Patent Office Re. Application No. 08808074.2.

(Continued)

*Primary Examiner* — Sai-Ming Chan

(57) ABSTRACT

A variable data rate wireless transmitter configured to receive input of data from a plurality of input channels and transmit at least some of the data over a variable data rate wireless point-to-point communication link, wherein portions of the data are associated with priorities, and the wireless transmitter is configured to change transmission of at least some of the portions of the data, based, at least partly, on the priorities associated with the portions of the data, and on a data rate configured for transmitting the portions of the data over the variable data rate wireless communication link. A variable data rate wireless receiver configured to receive data over a variable data rate wireless point-to-point communication link, including a delay compensation buffer configured to maintain a substantially fixed delay between input of the data into a wireless transmitter transmitting the data and output of the data from the delay compensation buffer, by maintaining a suitable output rate of the data from the delay compensation buffer. Related apparatus and methods are also described.

15 Claims, 6 Drawing Sheets

U.S. PATENT DOCUMENTS

| | | | |
|---|---|---|---|
| 6,728,233 | B1 | 4/2004 | Park et al. |
| 6,985,544 | B2 | 1/2006 | Matsui et al. |
| 7,839,952 | B2 | 11/2010 | Sofer et al. |
| 2002/0022468 | A1* | 2/2002 | Yoon et al. .................... 455/403 |
| 2003/0129978 | A1 | 7/2003 | Akiyama et al. |
| 2004/0073692 | A1* | 4/2004 | Gentle et al. .................. 709/231 |
| 2004/0165526 | A1 | 8/2004 | Yada et al. |
| 2004/0228326 | A1 | 11/2004 | Pearson |
| 2005/0137857 | A1* | 6/2005 | Greer ........................... 704/201 |
| 2006/0062242 | A1 | 3/2006 | Dacosta |
| 2007/0220184 | A1 | 9/2007 | Tierno |
| 2008/0002581 | A1* | 1/2008 | Gorsetman et al. ........... 370/232 |

FOREIGN PATENT DOCUMENTS

| | | |
|---|---|---|
| WO | WO 00/04728 | 1/2000 |
| WO | WO 2009/040799 | 4/2009 |
| WO | WO 2009/040800 | 4/2009 |
| WO | WO 2009/040801 | 4/2009 |

OTHER PUBLICATIONS

Communication Pursuant to Article 94(3) EPC Dated Sep. 8, 2010 From the European Patent Office Re. Application No. 08808075.9.

Communication Under Rule 71(3) EPC Dated Nov. 15, 2011 From the European Patent Office Re. Application No. 08808075.9.

Communication Pursuant to Article 94(3) EPC Dated Apr. 18, 2011 From the European Patent Office Re. Application No. 08808075.9.

Response Dated Mar. 3, 2011 to Communication Pursuant to Article 94(3) EPC of Sep. 8, 2010 From the European Patent Office Re. Application No. 08808074.2.

Official Action Dated Nov. 21, 2011 From the US Patent and Trademark Office Re. U.S. Appl. No. 12/678,527.

International Preliminary Report on Patentability Dated Apr. 1, 2010 From the International Bureau of WIPO Re.: Application No. PCT/IL2008/001273.

International Preliminary Report on Patentability Dated Apr. 1, 2010 From the International Bureau of WIPO Re.: Application No. PCT/IL2008/001274.

International Preliminary Report on Patentability Dated Apr. 1, 2010 From the International Bureau of WIPO Re.: Application No. PCT/IL2008/001275.

International Search Report Dated Apr. 6, 2009 From the International Searching Authority Re.: Application No. PCT/IL2008/001275.

International Search Report Dated Feb. 17, 2009 From the International Searching Authority Re.: Application No. PCT/IL2008/001273.

International Search Report Dated Feb. 18, 2009 From the International Searching Authority Re.: Application No. PCT/IL2008/001274.

Response Dated Feb. 9, 2010 to International Search Report and the Written Opinion of Apr. 6, 2009 From the International Searching Authority Re.: Application No. PCT/IL2008/001275.

Response Dated Feb. 9, 2010 to the Written Opinion of Feb. 18, 2009 From the International Searching Authority Re.: Application No. PCT/IL2008/001274.

Written Opinion Dated Apr. 6, 2009 From the International Searching Authority Re.: Application No. PCT/IL2008/001275.

Written Opinion Dated Feb. 17, 2009 From the International Searching Authority Re.: Application No. PCT/IL2008/001273.

Written Opinion Dated Feb. 18, 2009 From the International Searching Authority Re.: Application No. PCT/IL2008/001274.

Response Dated Feb. 2, 2011 to Communication Pursuant to Article 94(3) EPC of Sep. 8, 2010 From the European Patent Office Re. Application No. 08808075.9.

Communication Pursuant to Article 94(3) EPC Dated Jul. 11, 2011 From the European Patent Office Re. Application No. 08808074.2.

Notice of Allowance Dated Jun. 4, 2012 From the US Patent and Trademark Office Re. U.S. Appl. No. 12/678,520.

Official Action Dated Sep. 11, 2012 From the US Patent and Trademark Office Re. U.S Appl. No. 12/678,527.

Official Action Dated Jan. 17, 2013 from the US Patent and Trademark Office Re. U.S. Appl. No. 12/678,527.

* cited by examiner

ERRORLESS AND HITLESS VARIABLE DATA RATE COMMUNICATIONS

RELATED APPLICATIONS

This Application is a National Phase of PCT Patent Application No. PCT/IL2008/001274 having International filing date of Sep. 23, 2008, which claims the benefit of U.S. Provisional Patent Application No. 60/960,288 filed on Sep. 24, 2007. The contents of the above Applications are all incorporated herein by reference.

FIELD OF THE INVENTION

The present invention relates to a system and method for variable data rate communication for use in point-to-point communication systems, and, more particularly but not exclusively, to errorless and hitless communication.

BACKGROUND OF THE INVENTION

Many packet communication protocols, such as Ethernet, and Internet Protocol (IP), allow for errors in data packets, and dropped packets. A receiver which discovers missing packets or data errors requests the transmitter to re-transmit the problem data packets. Typically, the problem data packets are eventually received later than they should have.

E1 signals usually transmit real time data, such as voice, and are considered high priority signals. Introducing errors, or dropping any data from these signals, should be avoided.

The term "communication channel" in all its forms is used throughout the present specification and claims interchangeably with the terms "channel" and "signal" and their corresponding forms.

Many point-to-point communication systems carrying high priority signals communicate at a data rate appropriate for a worst case reception scenario, in order not to drop the high priority signals. This is a waste of capacity most of the time, and increases the cost of such systems.

Adaptive Coding and Modulation (ACM) enables changing data rate of a communication system in response to time varying conditions such as interference and fading.

ACM is widely used in packet communication protocol systems such as wireless LAN (WiFi) and wireless MAN (WiMAX). Such systems reduce their data rate in response to interference and fading. During the process of reducing the data rate, data packets are typically lost and have to be retransmitted.

US Published Patent Application 2006/0077994 of Spindola et al describes systems and methods for adapting a de jitter buffer to conform to air link conditions. An air link characteristic may be detected before that characteristic begins to affect packet delivery, such as by slowing or speeding delivery delay at a subscriber station. A receiver-side de-jitter buffer, which adds delay to received packets, may adaptively adjust its size based upon the detected air link characteristic, such that the de jitter buffer is appropriately sized for anticipated data packets before they are received at the subscriber station.

US Published Patent Application 2006/0109856 of Deshpande describes an adaptive buffering scheme that supposedly allows more effective media transport and buffering. In one aspect of the adaptive buffering scheme, buffering parameters are adapted to different media characteristics, such as media play commands or the amount of encoding/transcoding required for the particular media stream. In another aspect of the adaptive buffering scheme, buffering is adapted to different transmission or memory conditions, such as transmission rate, packet jitter, or the amount of available buffer memory. In one example, the adaptive buffering is supported using Real Time Streaming Protocol (RTSP), and/or Real Time Transport Protocol (RTP) and associated Real Time Control Protocol (RTCP), and/or Session Description Protocol (SDP) messages.

The disclosures of all references mentioned above and throughout the present specification, as well as the disclosures of all references mentioned in those references, are hereby incorporated herein by reference.

SUMMARY OF THE INVENTION

The present invention seeks to provide an improved system and method for a variable data rate mechanism for use in point-to-point communication systems, providing a flexible path for changing data rate while supporting errorless and hitless communication of high priority signals. No loss of framing synchronization occurs during data rate changes, thereby providing uninterrupted and continuous service.

The term "data rate" in all its forms is used throughout the present specification and claims interchangeably with the terms "transmission data rate", "receiving data rate", and their corresponding forms.

A non-limiting example of a point-to-point communication system is a cellular backhaul point-to-point link. Traffic in such a system can comprise different types of data: data packets, such as Ethernet packets; and continuous fixed-data-rate streams, such as, by way of a non-limiting example, E1 communication channels.

Aspects of the present invention use variable data rate communication, such as ACM, for continuous fixed-data-rate streams, such as E1, and for a mix of continuous fixed-data-rate streams and packet communication.

When changing data rate over a transmission link, a transmission delay caused by the transmission link may change. One possible reason for the transmission delay change is a change of a coding mechanism. Even when the coding mechanism remains unchanged, a change of modulation type, such as, by way of a non-limiting example, from 64 QAM (Quadrature Amplitude Modulation) to 16 QAM, can cause a transmission delay change. When changing from 64 QAM to 16 QAM, each transmitted symbol carries 4 bits instead of 6 bits. If a symbol transmission rate is kept constant, more time is needed to transmit data at 4 bits per symbol than at 6 bits per symbol, thereby increasing the transmission delay.

In some embodiments of the present invention, maintaining a substantially fixed delay is achieved by having a receiver which includes a delay compensation buffer, which maintains a substantially fixed time delay irrespective of a data rate, that is, amount of data per time unit, flowing through the receiver.

In an exemplary embodiment of the invention, high priority signals which are designated by the system as do-not-drop are communicated by the system without dropping, without adversely affecting error rate, and without substantially affecting a delay produced by the point-to-point communication for the high priority signals.

Other signals, which are designated as lower priority, are usually also communicated by the system in parallel with the high priority signals.

When a need arrives for lowering data rate of the system, lower priority signals may be dropped, while high priority signals are still transmitted albeit possibly using a different coding. The change in data rate and the dropping of some signals do not affect the remaining signals which are still carried.

A non-limiting example of a need for changing the data rate of the system is when radio transmission is used for the point-to-point communication, and weather changes from fair to rainy, stormy, and so on. Such changes decrease a maximum data rate which can be communicated over the point-to-point communication link. In an exemplary embodiment of the invention, the data rate of the system is changed faster than changes in weather, changing, by way of a non-limiting example, in approximately 1 millisecond.

In an exemplary embodiment of the invention, the combination of the higher priority and lower priority signals provides more efficient use of transmission capacity than a pessimistic, worst-case system, which uses only a guaranteed, worst case, data rate.

The higher priority and the lower priority signals can optionally be continuous fixed-data-rate streams, such as E1. Optionally, some E1 communication are designated as channels which may be dropped, while other E1 communication channels, designated as not-to-drop channels, are still transmitted, without changing transmission delay and without adversely affecting error rate.

More than two levels of priority are optionally used, so that one or more signals are set up top be highest priority, and other signals are set up to be various values of lower priorities. In exemplary embodiments of the invention, signals are dropped according to order of priority.

The higher priority and the lower priority signals can optionally be packet-based communication channels, such as Ethernet communication channels. Some Ethernet communication channels are set up so they can optionally be dropped, while other Ethernet communication channels are set up so that they remain transmitted, without changing transmission delay and without adversely affecting error rate of the remaining communication channels. Within an Ethernet communication channel, some Ethernet data packets, according to an associated priority, can optionally be dropped, while other Ethernet data packets, according to an associated priority, remain in transmission, without changing transmission delay of other communication channels and of the transmitted Ethernet data packets and without adversely affecting error rate of remaining transmitted communication channels and Ethernet data packets.

The higher priority and the lower priority signals can optionally be a mix of continuous fixed-data-rate streams, such as E1, and packet-based communication channels, such as Ethernet communication channels. Some E1 communication channels can optionally be dropped, while other E1 communication channels are still transmitted, without changing transmission delay and without adversely affecting error rate of the remaining communication channels. Some Ethernet communication channels can optionally be dropped, and some Ethernet data packets can optionally be dropped, while other Ethernet communication channels and other Ethernet data packets within a same Ethernet communication channel are still transmitted, without changing transmission delay of other communication channels and without adversely affecting error rate of remaining transmitted communication channels.

According to one aspect of the present invention there is provided a variable data rate transmitter configured to receive input of data from a plurality of input channels and transmit at least some of the data over a variable data rate point-to-point communication link, wherein portions of the data are associated with priorities, and the transmitter is configured to change transmission of at least some of the portions of the data, based, at least partly, on the priorities associated with the portions of the data, and on a data rate configured for transmitting the portions of the data over the variable data rate communication link.

Optionally, the change of transmission of at least some of the portions of the data includes a dropping of the at least some of the portions of the data from transmission.

Optionally, the change of transmission of at least some of the portions of the data includes an adding of the at least some of the portions of the data to transmission.

Optionally, further including a multiplexer configured to multiplex at least some of the portions of the data received from the plurality of input channels.

Optionally, further including an adaptive framer configured to package at least some of the portions of the data in data frames.

Optionally, further including a variable data rate transmitter configured to transmit at least some of the portions of the data over the variable data rate communication link.

Optionally, the input channels include at least one continuous channel.

Optionally, the input channels include at least one packet-based channel.

Optionally, the variable data rate transmitter is configured to drop packets from, and add packets to, the portions of the data transmitted from the at least one packet based channel.

Optionally, the input channels include at least one continuous channel and at least one packet-based channel.

Optionally, the variable data rate transmitter is configured to drop channels from and add channels to transmission, and to drop packets from, and add packets to, the portions of the data transmitted from the at least one packet based channel.

According to another aspect of the present invention there is provided a variable data rate receiver configured to receive data over a variable data rate point-to-point communication link, including a delay compensation buffer configured to maintain a substantially fixed delay between input of the data into a transmitter transmitting the data and output of the data from the delay compensation buffer, by maintaining a suitable output rate of the data from the delay compensation buffer.

Optionally, further including a deframer configured to extract the data from data frames received by the variable data rate receiver.

Optionally, further including a demultiplexer configured to demultiplex the data and output one or more output channels.

According to yet another aspect of the present invention there is provided a system configured to transmit at least some of a plurality of channels over a variable data rate point-to-point communication link, the system including a variable data rate transmitter configured to receive input of data from a plurality of input channels and transmit at least some of the data over a variable data rate point-to-point communication link, wherein portions of the data are associated with priorities, and the transmitter is configured to change transmission of at least some of the portions of the data, based, at least partly, on the priorities associated with the portions of the data, and on a data rate configured for transmitting the portions of the data over the variable data rate communication link, and a variable data rate receiver configured to receive the at least some of the data over the variable data rate point-to-point communication link, including a delay compensation buffer configured to maintain a substantially fixed delay between input of the at least some of the data into the transmitter and output of the at least some of the data from the delay compensation buffer, by maintaining a suitable output rate of the at least some of the data from the delay compensation buffer.

Optionally, the change of transmission of at least some of the portions of the data includes a dropping of the at least some of the portions of the data from transmission.

Optionally, the change of transmission of at least some of the portions of the data includes an adding of the at least some of the portions of the data to transmission.

Optionally, the portions of the data which are not dropped from transmission maintain a substantially unchanged error rate while the transmitter performs dropping and adding portions of the data from transmission.

According to another aspect of the present invention there is provided a method for transmitting a plurality of communication channels over a variable data rate point-to-point communication link, the method including receiving input of data from a plurality of input channels, transmitting at least some of the data over the variable data rate point-to-point communication link, determining that the variable data rate has changed, and changing transmission of at least some portions of the data, while maintaining a substantially fixed delay and maintaining an error rate substantially as before, or better, in the portions of the data being transmitted.

Optionally, the changing transmission of at least some portions of the data includes a dropping of the at least some portions of the data from transmission.

Optionally, the changing transmission of at least some portions of the data includes an adding of the at least some portions of the data to transmission.

Optionally, the variable data rate point-to-point communication link is an Adaptive Coding and Modulation (ACM) point-to-point communication link.

According to yet another aspect of the present invention there is provided a system configured to transmit at least some data from at least some of a plurality of channels over a variable data rate point-to-point communication link, the system including means for receiving input of data from the plurality of channels and transmitting at least portions of the data over the variable data rate point-to-point communication link, means for receiving the at least portions of the data over the variable data rate point-to-point communication link, means for changing the data rate, and means for changing the transmission of at least some portions of the data while maintaining a substantially fixed delay in the portions of the data being transmitted, and maintaining an error rate substantially as before, or better, in the portions of the data being transmitted.

Optionally, the means for maintaining a substantially fixed delay include a delay compensation buffer.

Unless otherwise defined, all technical and scientific terms used herein have the same meaning as commonly understood by one of ordinary skill in the art to which this invention belongs. The materials, methods, and examples provided herein are illustrative only and not intended to be necessarily limiting.

Implementation of exemplary methods and systems of the present invention involve performing or completing certain selected tasks or steps manually, automatically, or a combination thereof. Moreover, according to actual instrumentation and equipment of exemplary embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of exemplary embodiments of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of exemplary embodiments of the present invention only, and are presented in order to provide a description of the principles and conceptual aspects of the invention. In this regard, the description taken with the drawings makes apparent to those skilled in the art how the several forms of the invention may be embodied in practice.

In the drawings.

DESCRIPTION OF PREFERRED EMBODIMENTS

Figure 1:
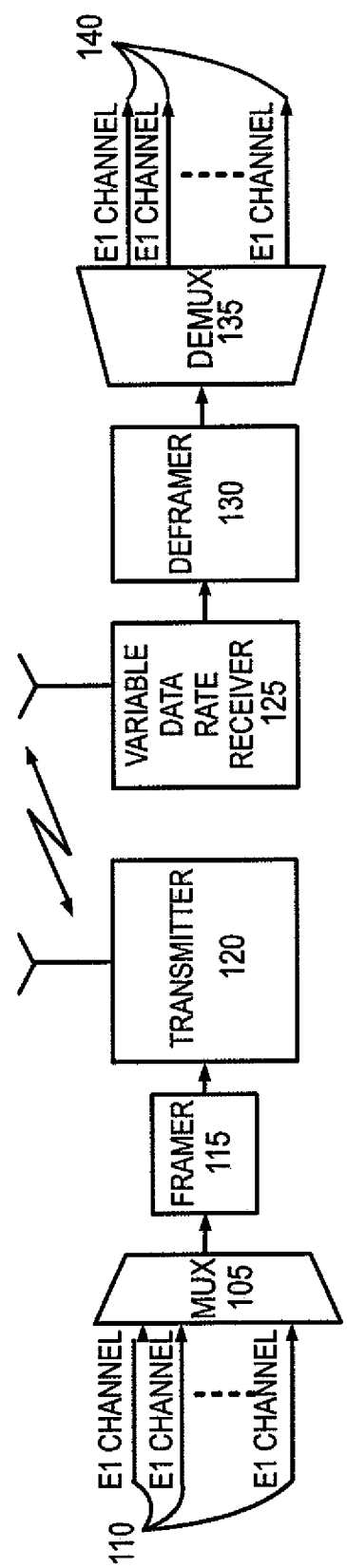
FIG. 1 is a simplified block diagram of a prior art system for point-to-point communication.

The present embodiments comprise a system and a method for a variable data rate communication mechanism for use in point-to-point communication systems, providing a flexible path for changing data rate while supporting errorless and hitless communication of high priority signals.

The principles and operation of an apparatus and a method according to exemplary embodiments of the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as necessarily limiting.

Reference is now made to FIG. 1, which is a simplified block diagram of a prior art system for point-to-point communication. A mux 105 accepts several E1 communication channel inputs 110, and multiplexes the E1 communication channel inputs 110. The mux 105 outputs the multiplexed E1 communication channels into a framer 115, which packages blocks of multiplexed data into frames (not shown). The frames are transmitted by a transmitter 120.

The frames are received by a variable data rate receiver 125, which transfers the frames to a deframer 130, which outputs a flow of multiplexed data to a demultiplexer 135. The demultiplexer 135 demultiplexes the multiplexed data into several E1 communication channels 140 corresponding to the E1 communication channel inputs 110, and outputs the E1 communication channels 140.

Figure 2:
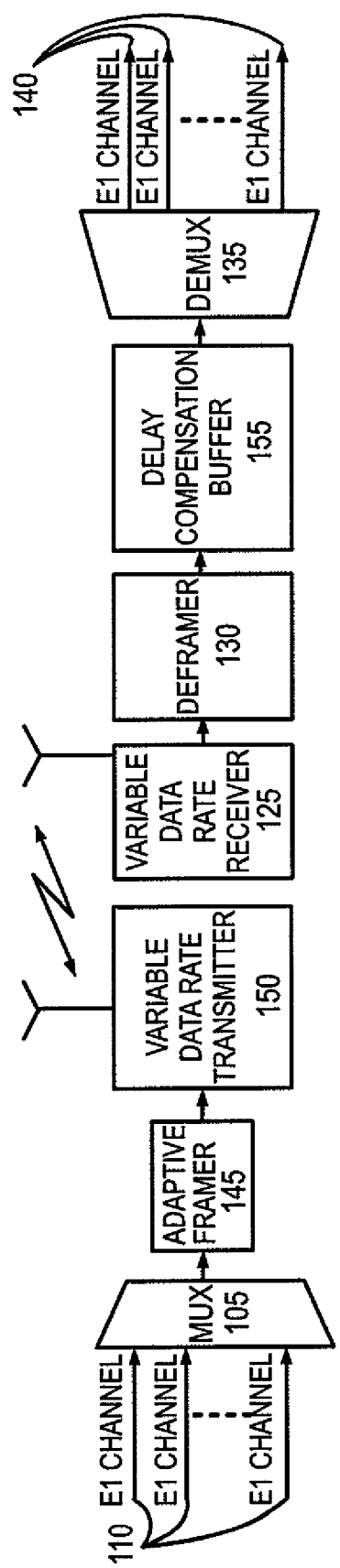
FIG. 2 is a simplified block diagram of a variable data rate point-to-point communication system constructed and operative in accordance with an exemplary embodiment of the present invention.

Reference is now made to FIG. 2, which is a simplified block diagram of a variable data rate point-to-point communication system constructed and operative in accordance with an exemplary embodiment of the present invention.

The mux 105 accepts several E1 communication channel inputs 110, and multiplexes the inputs 110. The mux 105 outputs the multiplexed E1 communication channels into an adaptive framer 145, which packages blocks of multiplexed data into frames, in a manner further described below with reference to FIG. 3. The adaptive framer 145 outputs a flow of frames to a variable data rate transmitter 150, which transmits the frames.

In exemplary embodiments of the present invention the mux 105 and the adaptive framer 145 are one unit, which accepts a plurality of inputs, and packages blocks of multiplexed data into frames.

Optionally, the multiplexed data may not be packaged in frames. Exemplary embodiments of the present invention maintain an errorless and hitless communication by maintaining a fixed delay, such that no loss of framing synchronization occurs during data rate changes, thereby providing uninterrupted and continuous service.

The frames are received by the variable data rate receiver 125, which transfers the frames to the deframer 130, which outputs a flow of multiplexed data to a delay compensation buffer 155.

The delay compensation buffer 155 outputs a flow of multiplexed data to the demultiplexer 135. The flow of multiplexed data being output by the delay compensation buffer 155 corresponds to the flow of frames being provided to the variable data rate transmitter 150, delayed by a substantially fixed period of time. The fixed period of time is substantially the period of time taken from entry of data into the system of FIG. 2 on the transmitter side, until exit from the system of FIG. 2 on the receiver side.

The demultiplexer 135 demultiplexes the multiplexed data into several E1 communication channels 140 corresponding to the E1 communication channel inputs 110, and outputs the E1 communication channels 140.

The variable data rate transmitter 150 can be, by way of a non-limiting example, a transmitter using Adaptive Code Modulation (ACM), to transmit at varying data rates. The data rate is optionally selected as high as possible without introducing unacceptable error rates.

Exemplary embodiments of the invention set a guaranteed capacity based on a worst case scenario, and add capacity of lower priority signals, optionally up to as high a data rate as possible without introducing unacceptable error rates.

In an embodiment of the present invention, the variable data rate transmitter 150 and the variable data rate receiver 125 communicate information about quality of transmission over a communication link between the variable data rate transmitter 150 and the variable data rate receiver 125. The information serves, at least partly, as a base for an agreement between the variable data rate transmitter 150 and the variable data rate receiver 125 as to which data rate should be used for data transmission over the communication link.

When the variable data rate transmitter 150 and the variable data rate receiver 125 have agreed on a data rate for the data transmission over the communication link, the system of FIG. 2 decides what portions of data to drop from or add to the data transmission.

The portions of data to be dropped and transmitted can be entire communication channels, and the portions can be some packets of data within communication channels, such as, by way of a non-limiting example, some data packets from an Ethernet communication channel.

In exemplary embodiments of the invention, the priorities associated with portions of data are set by various methods, such as described below with reference to FIG. 3.

In an exemplary embodiment of the present invention, the delay compensation buffer 155 maintains a substantially fixed delay between input of data to the mux 105 and output of data by the demux 135 by using a system and method for maintaining a substantially constant delay, over changing transmission data rates, such as described in a co-filed, co-pending and co-assigned patent application entitled "Maintaining a Constant Delay in Point-To-Point Transmission" Appl. No. 60/960,289 by Gabi Yakov, the disclosure of which is hereby incorporated by reference. The delay compensation buffer 155 reads an indication of a data rate used to input data into the system of FIG. 2 from the data being presently output. The indication is used to set a data output rate. By outputting data from the system at a same rate as which the data was input into the system, the system maintains a constant delay. After a change of the input data rate, the output data rate changes when the first data input at a new rate arrives at the output of the system. Therefore, one may understand a section from an input to the system to an output of the system as an elastic buffer-like mechanism, which maintains the same output rate as input rate, for the same data, both during periods of fixed data rate transmission, and during changes of the data rate.

In an alternative embodiment of the present invention, the delay compensation buffer 155 maintains a substantially fixed delay between input of signals to the mux 105 and output of signals by the demux 135 by using an adaptive buffering scheme such as described by US Published Patent Application 2006/0077994 of Spindola et al and US Published Patent Application 2006/0109856 of Deshpande.

Exemplary embodiments of the invention comprise a transmitter configured to drop signals according to priorities, and enabled to communicate with a receiver which is configured to receive transmitted signals and maintain an errorless and hitless reception of the transmitted signals.

Figure 3:
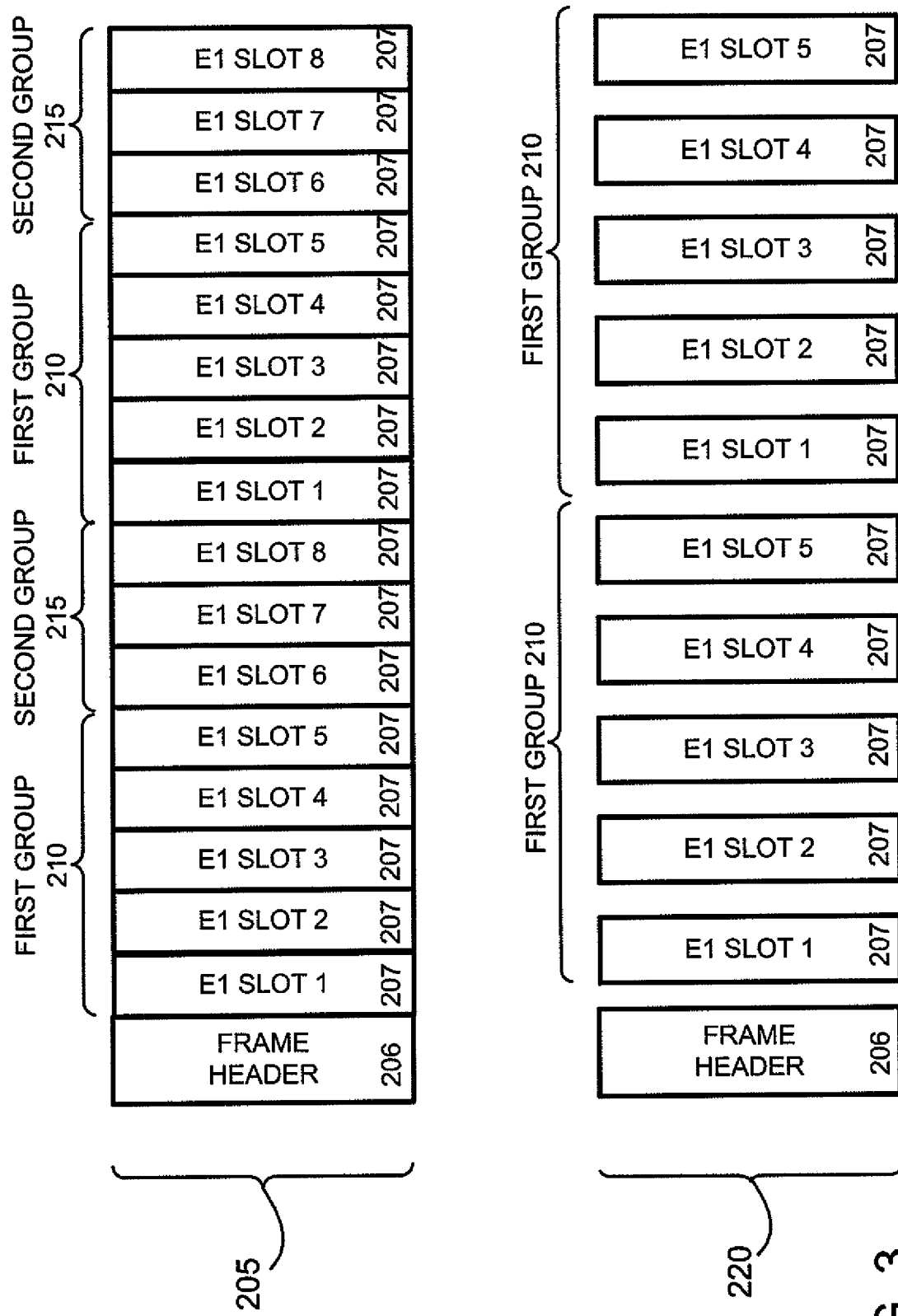
FIG. 3 is a simplified illustration of frames transmitted by the communication system of FIG. 2.

Reference is now made to FIG. 3, which is a simplified illustration of frames transmitted by the communication system of FIG. 2.

A first frame 205 is depicted, produced by the adaptive framer 145 (FIG. 1) when the variable data rate point-to-point communication system of FIG. 2 is operating in a high data rate mode. The first frame 205 comprises a frame header 206, and E1 channel slots 207.

Operation of the communication system of FIG. 2 will now be described with reference to FIG. 3.

By way of a non-limiting example, we shall assume the communication system of FIG. 2 accepts 8 E1 communication channel inputs 110 (FIG. 1). The digital data coming through the E1 communication channel inputs 110 is packaged in the E1 channel slots. By way of a non-limiting example, data from a first E1 communication channel input 110 is packaged in an E1 slot 1 207, data from a second E1 communication channel input 110 is packaged in an E1 slot 2 207, and so on. After 8 E1 slots 207 have been populated with data from the 8 E1 communication channel inputs 110, additional E1 slots 207 are populated with additional, following, data from the same corresponding E1 communication channel inputs 110, and so on.

By way of the same non-limiting example, we shall assume a first 5 E1 communication channel inputs 110 belong to a first group of channels 210, and the next 3 E1 communication channel inputs 110 belong to a second group of channels 215, and that the first group of channels 210 is considered more important than the second group of channels 215.

A second frame 220 is also depicted, produced by the adaptive framer 145 (FIG. 1) when the variable data rate point-to-point communication system of FIG. 2 is operating in a data rate mode with lower data rate than depicted with reference to the first frame 205. The system of FIG. 2 therefore drops some data from transmission relative to the data transmitted by the first frame 205.

The second frame 220 also comprises a frame header 206, and E1 channel slots 207. The variable data rate communication system of FIG. 2 is operating at a lower data rate, and has stopped populating E1 slots with data from the second group of communication channels 215. The adaptive framer 145 packages only data from the first group of communication channels 210, thus dropping the second group of channels 215.

Data from more than two groups of communication channels can be packaged in a frame. The groups of communication channels are optionally arranged in a hierarchy of importance, or priority, and data from the communication channels is optionally dropped based on available data rate and in an order based on the hierarchy.

When two communication channels are in equal places in the hierarchy, and data from one of the communication channels needs to be dropped, the communication channel selected for which data is to be dropped can be arbitrary.

The hierarchy of priority can be determined based, at least partly, on predetermined features of the E1 communication channel inputs 110 to the mux 105 (FIG. 1) such as an order of input ports to which the E1 communication channels inputs 110 are connected; on operator inputs to a configuration mechanism which associates priorities to E1 communication channel inputs; and on a configuration mechanism which senses features of the data carried by the E1 communication channel inputs and associates priorities to the E1 communication channel inputs based at least partly on the features of the data.

The order of the E1 slots need not be as depicted in FIG. 3, that is, E1 slot 1, E1 slot 2, ... E1 slot 8, and again, repeating the same order. The order can be any other order without affecting the operation of the communication system of FIG. 2.

When the variable data rate point-to-point communication system of FIG. 2 is operating in a data rate mode with higher data rate than depicted with reference to the second frame 220, the adaptive framer 145 correspondingly packages more data into a frame than is packaged in the second frame 220.

The non-limiting example given of E1 communication channel inputs applies as well to other PDH (Plesiochronous Digital Hierarchy) communication channels, such as, by way of a non-limiting example, T1 communication channels.

The non-limiting example given of E1 communication channels applies as well to other types of communication channels, such as, by way of a non-limiting example, isochronous and synchronous communication channels.

In addition to data from PDH communication channels, it is possible to transmit data from packet based communications via the communication system of FIG. 2. By way of a non-limiting example, it is possible to transmit data from Ethernet communication via the communication system of FIG. 2. The fact that the communication system of FIG. 2 provides a substantially errorless and fixed delay communication link does not affect adversely Ethernet communication.

Figure 4:
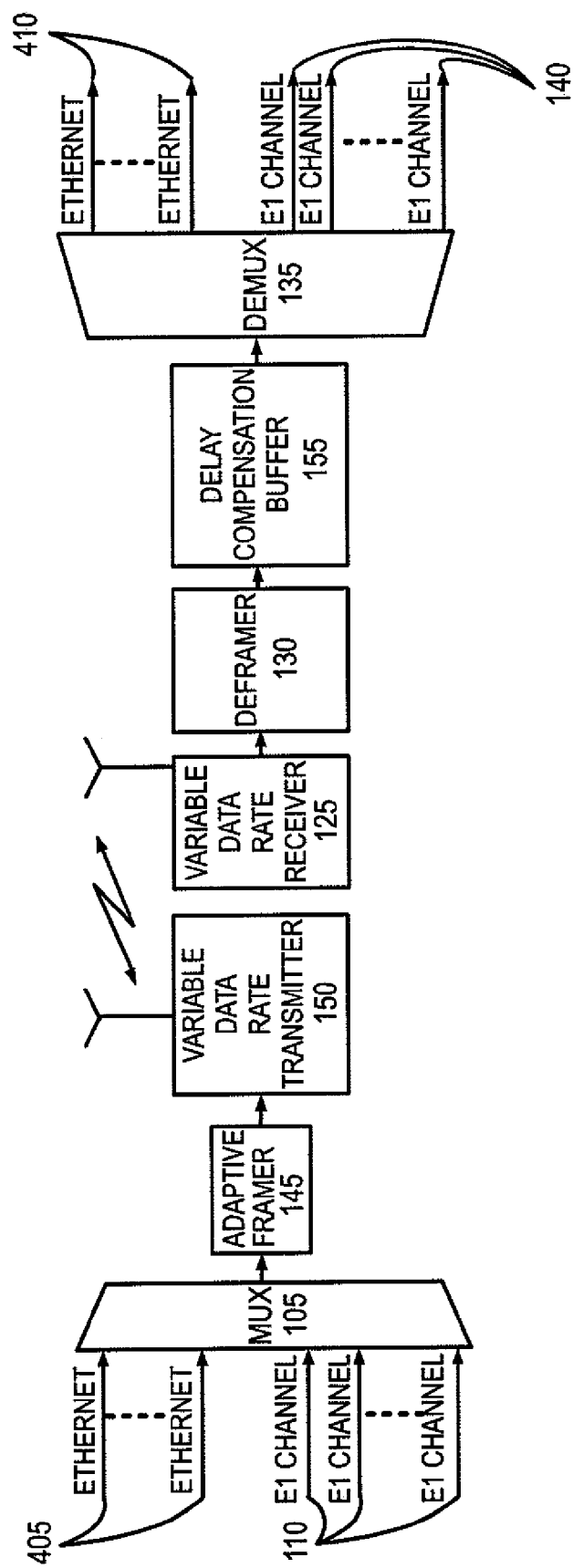
FIG. 4 is a simplified block diagram of an alternative embodiment of the communication system of FIG. 2.

Reference is now made to FIG. 4, which is a simplified block diagram of an alternative embodiment of the communication system of FIG. 2.

The mux 105 accepts data from several E1 communication channel inputs 110, as well as data from several Ethernet communication channel inputs 405, and multiplexes the data from the E1 communication channel inputs 110 and the data from the Ethernet communication channel inputs 405. The mux 105 outputs the multiplexed data into an adaptive framer 145, which packages blocks of multiplexed data into frames, in a manner further described below with reference to FIG. 5. The adaptive framer 145 outputs a flow of frames to a variable data rate transmitter 150, which transmits the frames.

The frames are received by the variable data rate receiver 125, which transfers the frames to the deframer 130, which outputs a flow of multiplexed data to a delay compensation buffer 155.

The delay compensation buffer 155 outputs a flow of multiplexed data to the demultiplexer 135. The flow of multiplexed data being output by the delay compensation buffer 155 corresponds to the flow of frames being provided to the variable data rate transmitter 150, delayed by a substantially fixed period of time.

The demultiplexer 135 demultiplexes the multiplexed data into several E1 communication channels 140 corresponding to the E1 communication channel inputs 110, and several Ethernet communication channels 410 corresponding to the Ethernet inputs 405, and outputs the E1 communication channels 140 and the Ethernet communication channels 410.

The variable data rate transmitter 150 can be, by way of a non-limiting example, a transmitter using Adaptive Code Modulation (ACM), to transmit at varying data rates. The transmission data rates are optionally selected as high as possible without introducing unacceptable error rates.

Figure 5:
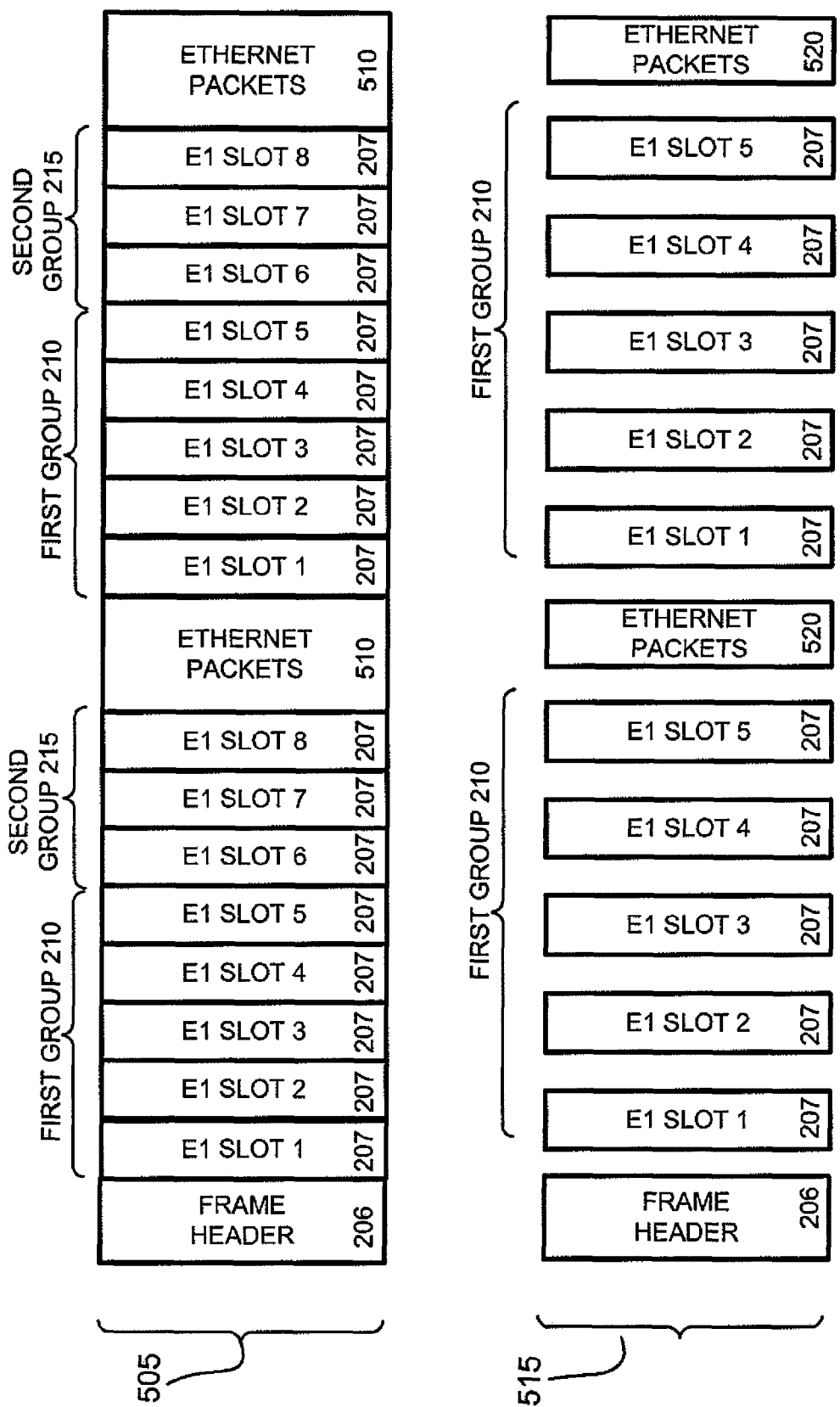
FIG. 5 is a simplified illustration of frames transmitted by the system of FIG. 4.

Reference is now made to FIG. 5, which is a simplified illustration of frames transmitted by the communication system of FIG. 4.

A first frame 505 is depicted, produced by the adaptive framer 145 (FIG. 1) when the variable data rate point-to-point communication system of FIG. 4 is operating in a high data rate mode. The first frame 505 comprises a frame header 206, E1 channel slots 207, and slots for Ethernet packets 510.

Operation of the communication system of FIG. 4 will now be described with reference to FIG. 5.

By way of a non-limiting example, we shall assume the communication system of FIG. 4 accepts 8 E1 communication channel inputs 110 (FIG. 4) and several Ethernet communication channel inputs 405 (FIG. 4). The data coming through the E1 communication channel inputs 110 are packaged in the E1 channel slots, and the data coming through the Ethernet communication channel inputs 405 are packaged in the slots for Ethernet packets 510.

By way of a non-limiting example, data from a first E1 communication channel input 110 is packaged in an E1 slot 1 207, data from a second E1 communication channel input 110 is packaged in an E1 slot 2 207, and so on. Data from the Ethernet communication channels is packaged in an Ethernet slot 510. After 8 E1 slots 207 have been populated with data from the 8 E1 communication channel inputs 110, additional E1 slots 207 are populated with additional, following, data from the same corresponding E1 communication channel inputs 110, and so on. Optionally, additional Ethernet slots 510 can be interspersed within the first frame 505.

By way of the same non-limiting example, we shall assume a first 5 E1 communication channel inputs 110 belong to a first group of channels 210, and the next 3 E1 communication channel inputs 110 belong to a second group of channels 215, and that the first group of channels 210 is considered more important than the second group of channels 215. We shall also assume that some of the Ethernet data packets are considered more important than others, and possess an importance equal to the first group of channels 210, while other Ethernet data packets are of relatively lower importance.

A second frame 515 is also depicted, produced by the adaptive framer 145 (FIG. 4) when the variable data rate point-to-point communication system of FIG. 4 is operating in a data rate mode with lower data rate than depicted with reference to frame 505. The second frame 515 also comprises a frame header 206, E1 channel slots 207, and Ethernet slots 520. The variable data rate communication system of FIG. 4 is operating in lower data rate, and has stopped packaging E1 slots with data from the second group of communication channels 215, and has stopped packaging data from lower priority Ethernet data packets. The adaptive framer 145 packages only data from the first group of communication channels 210 and data from higher priority Ethernet data packets, thus dropping the second group of channels 215 and the lower priority Ethernet data packets.

The same hierarchy of importance, or priority, applied to the data of the E1 communication channels, can be applied to Ethernet data packets, using the same yardstick to measure priority in both types of communications.

Persons skilled in the art will appreciate that IEEE standard 802.1p defines 3 class-of-service bits which are embedded in packet headers, and which assist in determining which packets may receive which class of service from a communication link.

An embodiment of the present invention determines priority of Ethernet packets based, at least partly, on the class-of-service bits.

A non-limiting example of data packet communication which would benefit from high priority is Voice-over-IP (VoIP). A VoIP communication channel is sensitive to changing delays and to dropped packets, and requires a high priority, thus becoming a communication channel which behaves similarly to a continuous communication channel, like a typical E1 channel.

A non-limiting example, in which some E1 channels are considered high priority, while other E1 channels are considered low priority, is inverse multiplexing from ATM to E1. In such a case E1 channels can contain both voice and data. By splitting voice and data to separate E1 channels, high and low priority E1 channels are obtained.

In some cases a service level agreement determines a guaranteed bit rate for Ethernet packets, typically for high priority packet applications such as Voice-over-IP. In such a case, E1 channels may be of lower priority than Ethernet packets having the guaranteed bit rate. Identification of the high priority Ethernet packets can be done in any suitable manner, such as, by way of a non-limiting example, using quality-of-service bits comprised in the Ethernet packets, using source address and/or target address comprised in the Ethernet packets, and so on.

In any case, in an exemplary embodiment of the invention, when dropping E1 channels, remaining E1 channels do not experience a substantial increase in bit error rate, and do not experience a change in transmission delay over the point-to-point communication link.

In a non-limiting practical example of use of the present invention, operators of exemplary embodiments of the system of the present invention are interested in defining a minimal number of E1 signals to be carried in a worst case scenario. Definition can be done in any suitable manner, such as, by way of a non-limiting example, by an order of input ports to which the E1 signal inputs are connected; by operator inputs to a configuration mechanism which associates priorities to E1 signal inputs; and by a configuration mechanism which senses features of the data carried by the E1 signals and associates priorities to the E1 signals based at least partly on the features of the data. The defining can be done directly at the communication system, or alternatively by remote communication with the communication system through a suitable system input.

Exemplary embodiments of the invention are used in a cellular point-to-point link.

In yet another non-limiting practical example of use of the present invention, when the system of the present invention is also used for Ethernet packet transmission, operators of the system are also interested in defining a minimal bit rate allocated for Ethernet packets, sometimes referred to as a guaranteed bit rate.

An embodiment of the present invention uses more than one link for the point-to-point communication, and divides the data to be communicated among the more than one link according to a capacity of the links, as described in U.S. Provisional Patent Application 60/929,943 of Yakov et al, filed 19 Jul. 2007.

U.S. Provisional Patent Application of Yakov et al, filed 19 Jul. 2007, describes a method of transmitting data over a plurality of parallel transmission links, including dividing the data into a plurality of portions, and for each one of the portions in consecutive order providing the portion to a transmitter, and sending the portion over a transmission link connected to the transmitter, wherein the providing is made according to a plan which is independent of addressing information associated with the data, and a method for reassembling data from a plurality of portions of the data received over a plurality of parallel transmission links including copying a first portion, according to an order among the portions, thereby producing partially reassembled data, from each one of the plurality of parallel transmission links, copying and appending a next portion to the partially reassembled data, according to the order among the portions, and continuing the copying and appending until the data has been completely reassembled.

Figure 6:
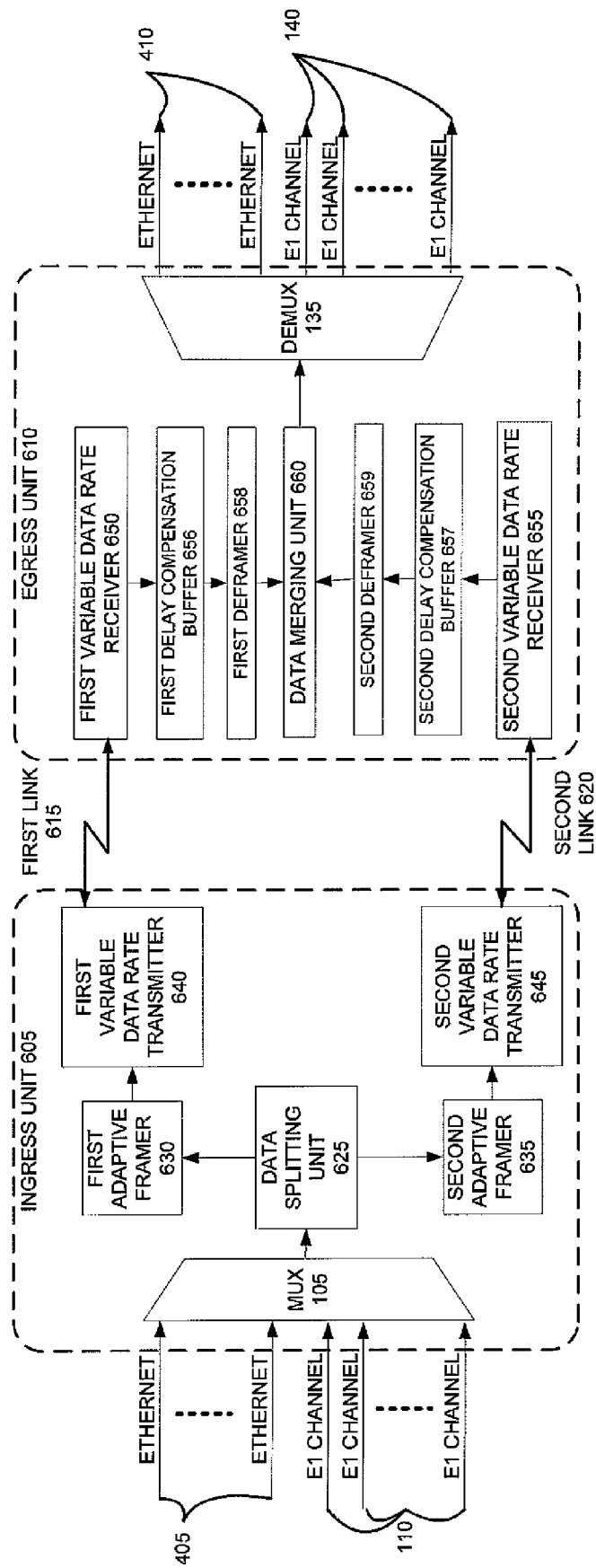
FIG. 6 is a simplified block diagram of yet another alternative embodiment of the communication system of FIG. 2.

Reference is now made to FIG. 6, which is a simplified block diagram of yet another alternative embodiment of the communication system of FIG. 2.

The system of FIG. 6 is an exemplary embodiment of the present invention which follows Yakov et al.

The system of FIG. 6 depicts a point-to-point link ingress unit 605 and a point-to-point link egress unit 610, communicating via, by way of a non-limiting example, two wireless links: a first link 615, and a second link 620.

The mux 105 accepts several E1 communication channel inputs 110, as well as several Ethernet communication channel inputs 405, and multiplexes the data from the E1 communication channel inputs 110 and the data from the Ethernet communication channel inputs 405. The mux 105 outputs the multiplexed data into a data splitting unit 625, which splits the multiplexed data to a first adaptive framer 630 and a second adaptive framer 635. The multiplexed data is split among the first adaptive framer 630 and the second adaptive framer 635 according to relative data rate capacities of the first link 615 and the second link 620, as described in the above-mentioned U.S. Provisional Patent Application 60/929,943 of Yakov et al.

The data is split such that portions of the data may be sent to either of the first adaptive framer 630 or the second adaptive framer 635. The portions within each of the adaptive framers 630 635 are kept in correct relative order. Indications of which data packaging plan was used by the adaptive framers 630 635 are packaged along with the data, so that the data can be reassembled in correct order by the egress unit 610.

It is to be appreciated that the first adaptive framer 630 and the second adaptive framer 635 package the multiplexed data into frames as described above with reference to FIGS. 3 and 5.

The first adaptive framer 630 and the second adaptive framer 635 each send frames to a first variable data rate transmitter 640 and a second variable data rate transmitter 645 respectively. The first variable data rate transmitter 640 and the second variable data rate transmitter 645 each send the data frames over the first link 615 and the second link 620 respectively, to a first variable data rate receiver 650 and a second variable data rate receiver 655 respectively, which are comprised in the egress unit 610.

The first variable data rate receiver 650 and the second variable data rate receiver 655 send the received frames to a first delay compensation buffer 656 and to a second delay compensation buffer 657 respectively. The first delay compensation buffer 656 and the second delay compensation buffer 657 operate substantially as described above with reference to the delay compensation buffer 155 of FIGS. 2 and 4.

The first delay compensation buffer 656 and the second delay compensation buffer 657 produce outputs of frames, which are provided to a first deframer 658 and a second deframer 659 respectively. The first deframer 658 and the second deframer 659 operate substantially as described above with reference to the deframer 130 of FIGS. 2 and 4.

The first deframer 658 and the second deframer 659 produce output of data which is sent to a data merging unit 660, which aligns the data and merges the data as described in the above-mentioned U.S. Provisional Patent Application 60/929,943 of Yakov et al.

The data merging unit 660 sends aligned and merged data to the demux 135, and the demux 135 produces output. The output can comprise several E1 communication channels 140 corresponding to E1 communication channel inputs 110 which were transmitted, and several Ethernet communication channels 410 corresponding to transmitted portions of the Ethernet inputs 405, as described above with reference to FIGS. 2 and 4.

Embodiments of the present invention constructed according to the system of FIG. 6 provide an additional mode of flexibility to point-to-point communication systems. When capacity of the first link 615 changes, capacity of the second link 620 may or may not change in the same way. The data rate over the first link 615 may change, as well as the data rate over the second link 620. Some data may be shifted from one of the links, and added to another of the links, keeping higher priority data in transmission, all the while maintaining an errorless and hitless communication link.

It is expected that during the life of this patent many relevant devices and systems will be developed and the scope of the terms herein, particularly of the terms frame, Adaptive Code Modulation (ACM), Adaptive Modulation and Coding (AMC), constellation, radio, wireless, point-to-point, Ethernet, and PDH, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A variable data rate wireless transmitter configured to receive input of data from a plurality of input channels and transmit at least some of the data over a wireless variable data rate point-to-point communication link, wherein:
   the input channels comprise at least one continuous channel;
   the input channels comprise at least one packet-based channel;
   portions of the data are associated with priorities; and
   the wireless transmitter is configured to change transmission of at least some of the portions of the data, based, at least partly, on the priorities associated with the portions of the data, and on a data rate configured for transmitting the portions of the data over the wireless variable data rate communication link, without adversely affecting an error rate associated with the transmission while the wireless transmitter performs dropping and adding portions of the data from transmission.

2. The variable data rate wireless transmitter according to claim 1 and further comprising a multiplexer configured to multiplex at least some of the portions of the data received from the plurality of input channels.

3. The variable data rate wireless transmitter according to claim 1 and further comprising an adaptive framer configured to package at least some of the portions of the data in data frames.

4. The variable data rate wireless transmitter according to claim 1 and wherein the variable data rate transmitter is configured to drop packets from, and add packets to, the portions of the data transmitted from the at least one packet based channel.

5. The variable data rate wireless transmitter according to claim 1 and wherein the variable data rate wireless transmitter is configured to drop channels from and add channels to transmission, and to drop packets from, and add packets to, the portions of the data transmitted from the at least one packet based channel.

6. A variable data rate wireless receiver configured to receive data over a variable data rate wireless point-to-point communication link, comprising a delay compensation buffer configured to maintain a substantially fixed delay between input of the data into a wireless transmitter transmitting the data and output of the data from the delay compensation buffer, by reading an indication of a data rate used to input data into the wireless transmitter and maintaining an output rate of the data from the delay compensation buffer equal to the indicated data rate.

7. A system configured to transmit at least some of a plurality of channels over a variable data rate wireless point-to-point communication link, the system comprising:

a variable data rate wireless transmitter configured to receive input of data from a plurality of input channels, the input channels comprising at least one continuous channel and at least one packet-based channel, and transmit at least some of the data over a variable data rate wireless point-to-point communication link, wherein:

portions of the data are associated with priorities; and the wireless transmitter is configured to change transmission of at least some of the portions of the data, based, at least partly, on the priorities associated with the portions of the data, and on a data rate configured for transmitting the portions of the data over the variable data rate wireless point-to-point communication link; and a variable data rate wireless receiver configured to receive the at least some of the data over the variable data rate wireless point-to-point communication link, comprising a delay compensation buffer configured to maintain a substantially fixed delay between input of the at least some of the data into the wireless transmitter and output of the at least some of the data from the delay compensation buffer, by maintaining a suitable output rate of the at least some of the data from the delay compensation buffer.

8. The system according to claim 7 and wherein the change of transmission of at least some of the portions of the data comprises a dropping of the at least some of the portions of the data from transmission.

9. The system according to claim 7 and wherein the change of transmission of at least some of the portions of the data comprises an adding of the at least some of the portions of the data to transmission.

10. A method for transmitting a plurality of communication channels over a variable data rate wireless point-to-point communication link, the method comprising:

receiving input of data from a plurality of input channels, wherein the input channels comprise at least one continuous channel and at least one packet-based channel;

transmitting at least some of the data over the variable data rate wireless point-to-point communication link;

determining that the variable data rate has changed; and changing transmission of at least some portions of the data, while maintaining a substantially fixed delay and maintaining an error rate substantially as before, or better, in the portions of the data being transmitted.

11. The method according to claim 10 and wherein the changing transmission of at least some portions of the data comprises a dropping of the at least some portions of the data from transmission.

12. The method according to claim 10 and wherein the changing transmission of at least some portions of the data comprises an adding of the at least some portions of the data to transmission.

13. The method according to claim 10 and wherein the variable data rate wireless point-to-point communication link is an Adaptive Coding and Modulation (ACM) wireless point-to-point communication link.

14. A system configured to transmit at least some data from at least some of a plurality of input channels, the input channels comprising at least one continuous channel and at least one packet-based channel, over a variable data rate wireless point-to-point communication link, the system comprising:

means for receiving input of data from the plurality of channels and transmitting at least portions of the data over the variable data rate wireless point-to-point communication link;

means for receiving the at least portions of the data over the variable data rate wireless point-to-point communication link;

means for changing the data rate; and means for changing the transmission of at least some portions of the data while maintaining a substantially fixed delay in the portions of the data being transmitted, and maintaining an error rate substantially as before, or better, in the portions of the data being transmitted.

15. The system according to claim 14 and wherein the means for maintaining a substantially fixed delay comprise a delay compensation buffer.

* * * * *